United States Patent [19]

Adam et al.

[11] Patent Number: 5,291,088

[45] Date of Patent: Mar. 1, 1994

[54] ELECTRIC MOTOR WITH WATERTIGHT CONSTRUCTION

[75] Inventors: Peter Adam, Höchberg; Werner Seuffert, Bergrheinfeld; Manfred Hofmann, Hettstadt; Hans-Joachim Müller, Burkardroth, all of Fed. Rep. of Germany

[73] Assignee: Siemens Aktiengesellschaft, Munich, Fed. Rep. of Germany

[21] Appl. No.: 828,888

[22] PCT Filed: Aug. 23, 1990

[86] PCT No.: PCT/EP90/01408

§ 371 Date: Jan. 29, 1992

§ 102(e) Date: Jan. 29, 1992

[87] PCT Pub. No.: WO91/03095

PCT Pub. Date: Mar. 7, 1991

[30] Foreign Application Priority Data

Aug. 25, 1989 [EP] European Pat. Off. ........ 89115738.0
Aug. 25, 1989 [DE] Fed. Rep. of Germany ....... 8910214
Aug. 17, 1990 [EP] European Pat. Off. ........ 90115826.1
Aug. 17, 1990 [DE] Fed. Rep. of Germany ....... 9011962

[51] Int. Cl.$^5$ .................................................. H02K 5/10
[52] U.S. Cl. ........................................ 310/88; 310/71
[58] Field of Search ................ 310/43, 85, 87, 88, 310/89, 90, 71, 239

[56] References Cited

U.S. PATENT DOCUMENTS

| | | | |
|---|---|---|---|
| 3,308,316 | 3/1967 | Pfahl | 310/71 |
| 3,455,174 | 7/1969 | Pickles | 74/606 |
| 3,535,564 | 10/1970 | Anastasia et al. | 310/42 |
| 4,387,313 | 6/1983 | Yamamoto et al. | 310/87 |
| 4,713,568 | 12/1987 | Adam et al. | 310/112 |
| 4,727,274 | 2/1988 | Adam et al. | 310/239 |

FOREIGN PATENT DOCUMENTS

| | | |
|---|---|---|
| 0221304 | 9/1986 | European Pat. Off. ........... 310/88 |
| 0219681 | 4/1987 | European Pat. Off. . |
| 2530885 | 1/1984 | France . |

OTHER PUBLICATIONS

Patent Abstracts of Japan, vol. 8, No. 194, Sep. 6, 1984, & JP-A-59 83553, May 15, 1984.
Patent Abstracts of Japan, vol. 5, No. 129 Aug. 19, 1981, & JP-A-56 66153, Jun. 4, 1981.

*Primary Examiner*—R. Skudy
*Assistant Examiner*—Matthew Nguyen
*Attorney, Agent, or Firm*—Kenyon & Kenyon

[57] ABSTRACT

A moisture-proof coupling, which is simple in design and easy to assemble, is disposed between a motor housing and a bearing plate, with the electrical leads running out through the moisture-proof coupling. The electrical leads are integrally molded in an insulated lead-insert, which can be inserted into an opening on the end face of the bearing plate. A circumferential sealing ring is molded on the insulated lead-insert. The sealing ring is injection-molded together with the lead-insert on a brush plate so that it can be pre-positioned and, when the motor is assembled, can be pressed between the motor housing and the bearing plate to form a seal. The brush plate can be fixed together with the lead-insert and the sealing ring in the bearing plate in the manner of a pre-assembled component.

14 Claims, 1 Drawing Sheet

ELECTRIC MOTOR WITH WATERTIGHT CONSTRUCTION

BACKGROUND OF THE INVENTION

The invention relates to an electric motor having a watertight construction having an insulated lead-insert disposed between an end face of a motor housing and an axially protruding bearing plate.

In European Patent No EP-B1-0 221 304, an electric motor is described having a brush yoke with an integrally molded connector which housing radially projects beyond the opening of the motor housing. The molded connector is pushed, with a snug fit, into an axial longitudinal slot, which is open at the end face, of the motor housing. The molded connector can be fixed in its end operating position by placing the bearing plate against it. Openings are provided in the part of the connector housing projecting through the motor housing, through which the electrical leads run from outside to the brush arrangement which is arranged inside the motor housing. For sealing the electric motor, a compressible seal is interposed as a separate part in between the motor housing and the leads running to the outside of the motor housing.

In European Patent No. EP-A-0 219 681, an assembly unit, including a brush holder and a seal, can be prefabricated so that the seal is joined to the brush holder during preassembly by clamping, interlocking, bonding or welding. To avoid an undefined compression or lateral pushing away of the seal, buffers are provided on the end faces which press the seal together and are thereby mutually sealed. These buffers abut axially in front of one another with mutual bracing. The seal is disk-shaped and is provided with slot-shaped fitting openings in its circumferential direction. Guide lugs are formed onto the end faces and axially engage the slot-shaped fitting openings when the components to be sealed off are braced with the seal lying in between.

SUMMARY OF THE INVENTION

The expenditure for design and, in particular, assembly required to produce a moisture-proof sealed electric motor, in particular a commutator motor having a brush plate arranged in the vicinity of one bearing plate of the electric motor, can be substantially reduced by integrally molding the leads in an insulated lead-insert made of an insulating material. A circumferential sealing ring is molded on the insulated lead-insert in such a way that it can be pressed directly by the bearing plate or indirectly via the insulating material lead-insert against the end face of the motor housing to form a seal. As a result, with a molded or injection-molded part that can be produced as an individual component and can be assembled in a single operation, it is possible to run the leads out of the motor housing, in a sealed manner, and to seal the motor housing off by placing the bearing plate against it at the end face. This results in a low expenditure while maintaining the seal.

A further simplification of the assembly resulting from a reduction in the number of components to be individually assembled and an accompanying reduction in the number of assembly steps can be achieved according to a development of the invention by securing the insulated lead-insert on the brush plate. The sealing ring can be pre-positioned by placing it tangentially around the insulated lead-insert by securing the sealing ring to the brush plate with securing bars. The insulated lead-insert and the sealing ring, with its securing bars, are expediently and directly injection-molded onto the brush plate. As a result, the brush plate serves as a carrying component for the insulated lead-insert, with its injection-molded leads, and the entire sealing ring, which is already held in such a position that it reaches its sealing end operating position without additional manipulation measures when the motor housing and bearing plate are assembled.

According to a further development of the invention, an annular groove is provided in the bearing plate which extends over the periphery and is matched to the profile of the sealing ring and is an additional fixing aid for insertion fixing of the sealing ring. The annular groove is designed in such a way that, the sealing ring is held well in the bearing plate before it is placed against the motor housing, and after the assembly of the bearing plate on the motor housing, it is firmly pressed against the motor housing to form a seal. In this arrangement, a toroidal elevation running around the base of the annular groove may advantageously serve to press the groove, during the coupling of the bearing plate and the motor housing, into the base part of the sealing ring which lies against the bottom of the groove and to compress the sealing ring for the purpose of providing a tight fit.

To simplify the assembly, according to one development of the invention, the brush plate is fixed with the insulated lead-insert and the sealing ring on the bearing plate, in particular in the manner of a pre-assembled unit. In this arrangement, the insulated lead-insert advantageously engages non-positively in an open insertion opening on the end face on an axially protruding bearing edge of the bearing plate. The sealing ring and the end face of the motor housing are not limited to a circular shape and can be rectangular in shape, as well.

The invention as well as further advantageous developments of the invention according to the claims are described in greater detail below with reference to an exemplary embodiment diagrammatically illustrated in the drawings.

BRIEF DESCRIPTION OF THE DRAWINGS

FIG. 1 shows a low-power direct current motor excited by means of a permanent magnet, having a pot-shaped motor housing 1 and part shell-type magnets 9 secured on the inner periphery thereof, as well as a rotor arranged on a rotor shaft 11 with a commutator 12. The right open end face of the motor housing 1 is closed off by a bearing plate 5, out of which the rotor shaft 11 projects with an eccentric drive shaft end 13, which serves, for example, to drive a plunger on a hydraulic pump flanged onto the right axial end of the commutator motor.

Figure 1:
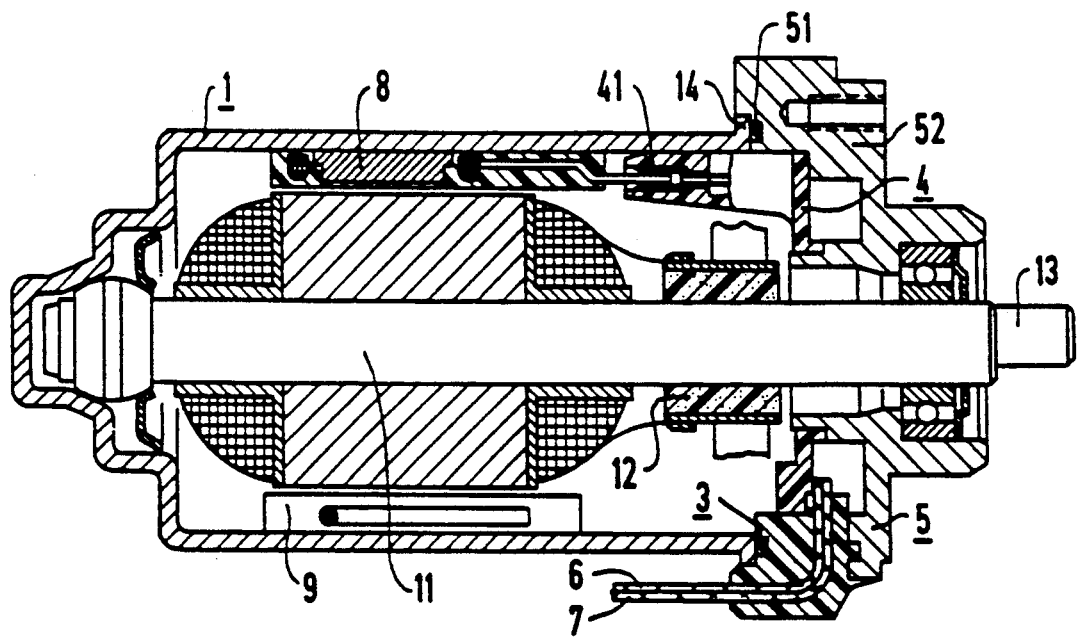
FIG 1 is in an axial longitudinal section diagram of a commutator motor having a brush plate fixed on the right bearing plate with a sealing ring and insulated lead-insert.

At its right end, the motor housing 1 has a bearing edge 14, bent radially outward, which axially and radially fixes the bearing plate 5 on the motor housing 1. The bearing edge 14 is pressed against a sealing ring 3 for the moisture-proof coupling between motor housing 1, and bearing plate 5. Electrical leads 6, 7 run from outside into the interior of the motor housing and serve, in particular, for the connection to electrical terminal points on a brush plate 4 or on a rotation detector 8 arranged between the tangential gaps of the part shell-type magnets 9. These electrical leads 6, 7 are molded integrally in an insulated lead-insert 2 which engages into an axial insertion opening on the end face of a bearing edge 52 of the bearing plate 5 projecting axially against the motor housing.

Figure 2:
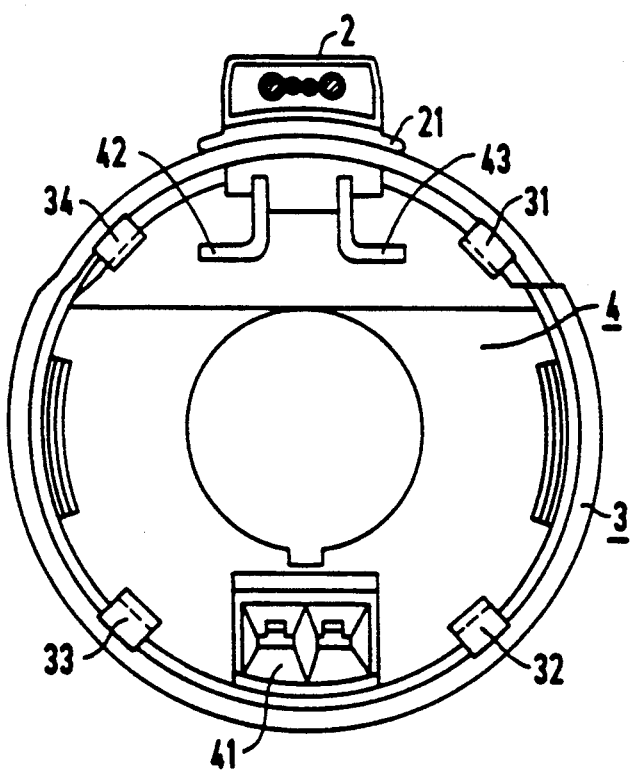
FIG. 2 is an end face top view of the brush plate of FIG. 1 with pre-assembled sealing ring and pre-assembled insulated lead-insert thereon.
Figure 3:
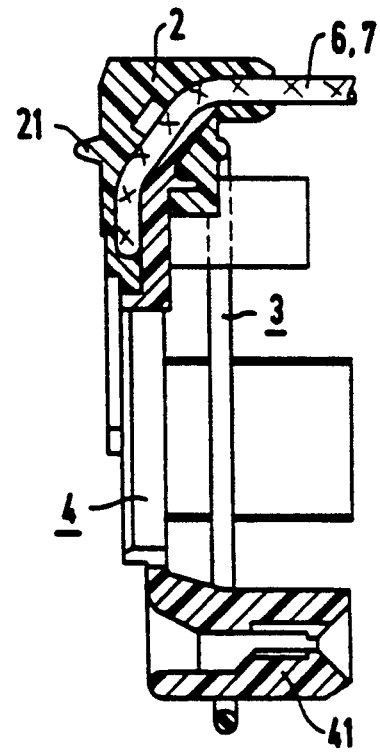
FIG. 3 is a radial longitudinal section through the brush plate of FIG. 2.

As can be seen in particular from FIGS. 2 and 3 the insulated lead-insert 2 with the injection-molded electrical leads 6, 7 is directly injection-molded onto the brush plate 4 in the manner of a pre-assembled unit. At the same time the circumferential sealing ring 3 is integrally molded on the insulated lead-insert 2. The sealing ring 3 is held in the tangential regions outside the insulated lead-insert 2 by securing bars 31-34 at a distance from the baseplate of the brush plate 4 in such a way that, when the brush plate 4 is mounted on the bearing plate 5, the sealing ring 3 comes to lie in its final sealing position without a great deal of manipulation. A circumferential annular groove 51 is provided here in the bearing plate 5 as a fixing aid for the sealing ring 3. Furthermore, injection-molded or molded on the brush plate 4 are, among others, mountings 42, 43 for suspendible brush holders and a mounting 41 for a plug connection of the rotation detector 8. The brush plate 4 is properly made of a polyamide and the insulated lead-insert 2 as well as the sealing ring 3 with its securing bars 31-34 are properly made of an elastomer.

The brush plate 4 with the injection-molded parts of the insulated lead-insert 2 with injection-molded lead 6, 7 and the sealing ring 3 injection-molded via the securing bars 31-34 can be fixed in the bearing plate 5 in the manner of a pre-assembled unit. The insulated lead-insert 2 supports this fixing as a result of its non-positive insertion into the axial insertion opening of the bearing edge 52 of the bearing plate 5. For additional sealing, the insulated lead-insert introduced into the insertion opening of the bearing plate 5 lies with a sealing edge 21 on the outside against the motor housing 1.

What is claimed is:

1. An electric motor having a watertight construction, comprising:
    a motor housing, having an open end face with an axially protruding edge;
    a bearing plate having a brush plate and a circumferential groove;
    an insulated lead-insert made of an insulating material and capable of holding a plurality of electrical leads coupled to the electric motor disposed within said motor housing, said insulated leadinsert arranged between the axially protruding edge of said motor housing and said bearing plate;
    a circumferential sealing ring molded on said insulated lead-insert, said circumferential sealing ring is molded onto the brush plate of said bearing plate as a preassembled unit, the groove of said bearing plate is capable of receiving and position in said sealing ring; and
    a plurality of securing bars coupling said sealing ring to the brush plate of said bearing plate, such that when the axially protruding edge of said motor housing is joined to said bearing plate, said sealing ring is pressed against the axially protruding edge of said motor housing by said bearing plate forming a watertight seal.

2. The electric motor of claim 1 wherein the groove of said bearing plate has a base and includes a toroidal elevation running around the base of said groove.

3. The electric motor of claim 1 wherein said bearing plate further includes a bearing edge, said bearing edge having an inside surface and capable of being positioned circumferentially around the axially protruding edge of said motor housing, said bearing edge including an opening capable of receiving said insulated lead-insert.

4. The electric motor of claim 3 wherein the brush plate of said bearing plate is made of an polyamide material, and said insulated lead-insert, said sealing ring and said securing bars are made of an elastomer material.

5. The electric motor of claim 3 wherein said brush plate, said insulate lead-insert and said sealing ring are coupled to said bearing plate as a pre-assembled unit.

6. The electric motor of claim 5 wherein said motor housing is pot-shaped.

7. The electric motor of claim 6 wherein said sealing ring and the open end face of said motor housing have a rectangular shape.

8. The electric motor of claim 7 wherein the brush plate of said bearing plate is made of an polyamide material, and said insulated lead-insert, said sealing ring and said securing bars are made of an elastomer material.

9. The electric motor of claim 3 wherein the axially protruding edge of said motor housing is bent radially outward, such that said axially protruding edge abuts the inner surface of the bearing edge of said bearing plate when said motor housing is inserted into said bearing plate.

10. The electric motor of claim 9 wherein the brush plate of said bearing plate is made of an polyamide material, and said insulated lead-insert, said sealing ring and said securing bars are made of an elastomer material.

11. The electric motor of claim 9 wherein said brush plate, said insulate lead-insert and said sealing ring are coupled to said bearing plate as a preassembled unit.

12. The electric motor of claim 11 wherein said motor housing is pot-shaped.

13. The electric motor of claim 12 wherein said sealing ring and the open end face of said motor housing have a rectangular shape.

14. The electric motor of claim 13 wherein the brush plate of said bearing plate is made of an polyamide material, and said insulated lead-insert, said sealing ring and said securing bars are made of an elastomer material.

* * * * *